United States Patent [19]

Descroix et al.

[11] Patent Number: 4,735,871
[45] Date of Patent: Apr. 5, 1988

[54] ACTIVATABLE BATTERY INCLUDING A HEAT EXCHANGER

[75] Inventors: Jean-Pierre Descroix, Fontenay sous Bois; Yannick Leben, Bobigny, both of France

[73] Assignee: Saft, S.A., Romainville, France

[21] Appl. No.: 100

[22] Filed: Jan. 2, 1987

[30] Foreign Application Priority Data

Jan. 16, 1986 [FR] France ................. 86 00565

[51] Int. Cl.⁴ ............................. H01M 8/04
[52] U.S. Cl. ...................... 429/26; 429/27; 429/34; 429/38; 429/51; 429/81; 429/14; 429/15
[58] Field of Search .......... 429/51, 81, 70, 26, 429/27, 34, 38, 14, 15

[56] References Cited

U.S. PATENT DOCUMENTS 3,507,704 4/1970 Webb et al. ............... 429/19
4,200,684 4/1980 Bro ........................ 429/51
4,202,772 5/1980 Goldstein ................ 210/232

FOREIGN PATENT DOCUMENTS 2300426 3/1976 France .
57-103271 6/1982 Japan .

Primary Examiner—Aaron Weisstuch
Attorney, Agent, or Firm—Kenyon & Kenyon

[57] ABSTRACT

An activatable battery including a heat exchanger, the battery comprising a Volta pile enclosed in an insulating envelope, with each cell of the pile comprising a porous cathode, a separator, a lithium anode, and a metal collector, and the heat exchanger being constituted by a circuit for forced circulation of the electrolyte, said circuit comprising:

electrolyte injection manifolds (25) and electrolyte collector manifolds (26), both having openings to the outside of said insulating envelope;

means for transferring electrolyte from the injection manifolds to the collector manifolds through each cell, said means including channels (121, 126) formed through at least one electrode of each cell; and a pump (22) for causing the electrolyte to circulate from the injection manifolds to the collector manifolds.

10 Claims, 7 Drawing Sheets

ACTIVATABLE BATTERY INCLUDING A HEAT EXCHANGER

The present invention relates to a heat exchanger arrangement for an activatable battery.

BACKGROUND OF THE INVENTION

The invention relates more particularly to batteries providing high power per unit mass. Such batteries, using the Li-SOCl$_2$ or the Li-SO$_2$Cl$_2$ couple are capable of delivering powers of several hundred of kilowatts while evolving the equivalent of 10% to 20% of the delivered energy in the form of heat. Unless such a battery is cooled, the lithium may melt, thereby destroying the battery long before the battery is fully discharged.

It is therefore essential to remove the heat evolved by the electrochemical reaction and to evacuate it initially out from the electrochemical block, and eventually out from the enclosure containing the electrochemical block.

The problem is difficult to solve in Li-SOCl$_2$ or Li-SO$_2$Cl$_2$ batteries in the form of a Volta pile in which each cell is constituted by very thin components having a small inter-electrode distance. For example each cell may comprise:

a porous cathode which is a few tenths of a millimeter thick;

a separator which is about one-tenth of a millimeter thick;

a lithium anode which is about one-tenth of a millimeter thick; and a nickel-plated copper current collector which is a few hundredths of a millimeter thick.

The copper current collector may be used to conduct heat, but its thickness cannot be increased because of the increase in weight that that would entail.

Further, the electrodes cannot be moved further apart since an increased gap would give rise to a sharp fall in the performance of the battery.

The aim of the present invention is to provide a structure which nevertheless enables the heat generated therein to be evacuated.

SUMMARY OF THE INVENTION

The present invention provides a heat exchanger arrangement for an activatable battery comprising a Volta pile enclosed in an insulating envelope, with each cell of the pile comprising a porous cathode, a separator, a lithium anode, and a metal collector, the heat exchanger arrangement being constituted by a circuit for forced circulation of the electrolyte, said circuit comprising:

electrolyte injection manifolds and electrolyte collector manifolds, both having openings to the outside of said insulating envelope;

means for transferring electrolyte from the injection manifolds to the collector manifolds through each cell, said means including channels formed through at least one electrode of each cell; and a pump for causing the electrolyte to circulate from the injection manifolds to the collector manifolds.

When the anodes are made of lithium, said channels are preferably provided through the cathodes of the cells.

The area of said channels advantageously lies between 5% and 20% of the area of the electrodes.

In a first embodiment, said injection manifolds and said collector manifolds are defined by a stacked set of coaxial central washers including a plurality of orifices. These washers include grooves for transferring electrolyte from said channels; further, every other cell includes a peripheral channel which communicates firstly with the channels of the same cell and secondly, via suitable orifices, with the channels of an adjacent cell.

In a second embodiment, the injection manifolds are defined by a stacked set of coaxial central washers comprising a plurality of orifices, while the collector manifolds are defined by a stacked set of coaxial peripheral washers including a plurality of orifices.

The central washers include grooves which put their injection orifices into communication with channels provided through the electordes; the peripheral washers have peripheral interconnection channels for putting their orifices into communication with channels provided in said electrodes.

Preferably, the radial channels provided in the electrode of one couple are angularly offset relative to the radial channels provided in the electrode of the preceding couple and in the electrode of the following couple.

BRIEF DESCRIPTION OF THE DRAWINGS

Embodiments of the invention are described by way of example with reference to the accompanying drawings, in which.

MORE DETAILED DESCRIPTION

Figure 1:
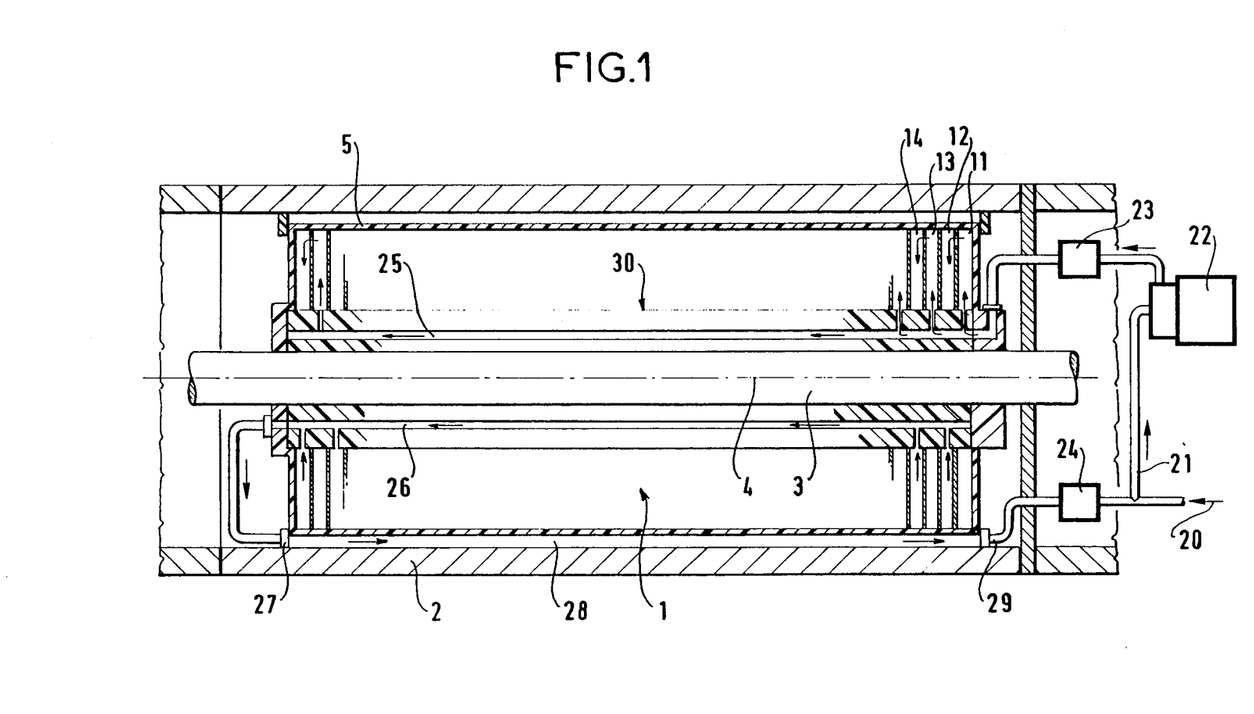
FIG. 1 is a highly diagrammatic partial section through a battery associated with means for circulating electrolyte therethrough and in accordance with the invention.

FIG. 1 is a highly diagrammatic section through a battery and its electrolyte feed arrangement.

The battery 1 in accordance with the invention is received in a sealed shell 2. It is constituted by a pile of electrochemical cells 11, 12, 13, 14, ..., whose structure is described in greater detail below. The pile assembly has a central duct 3 running therethrough along an axis 4, and it is covered with an insulating envelope 5.

The electrolyte is stored in a tank which does not form part of the invention. When the battery is activated, the electrolyte arrives along a duct 21 in the direction of arrow 20, and it is circulated through the battery 1 by means of a pump 22. References 23 and 24 designate respective valves. As shown in greater detail below, various ducts are provided through a central block 30 about the axis 4. The electrolyte flows along an injection manifold 25, then through odd-numbered cells 11, 13, . . . , etc., and then through even numbered cells (i.e. from cell 11 to cell 12, from cell 13 to cell 14, etc., . . . ), and finally from the even-numbered cells to a collector manifold 26. The collector manifold has an outlet 27 in communication with a peripheral annular chamber 28 located between the shell 2 and the insulating envelope 5. The outlet 29 from said chamber communicates with the inlet duct 21 to the pump.

Figure 2:
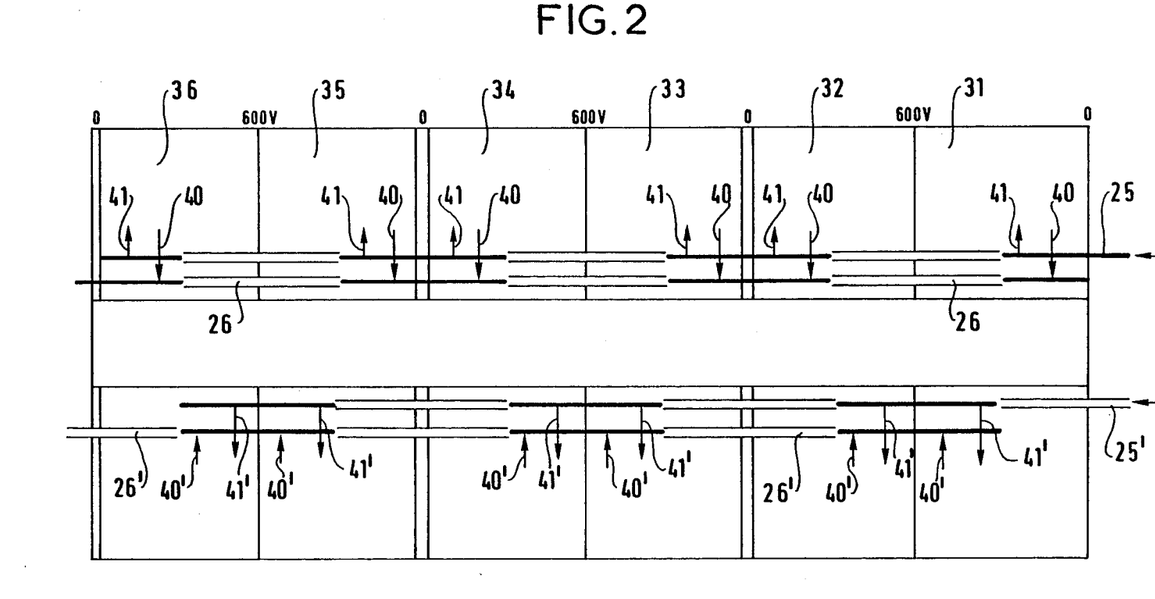
FIG. 2 is a hydraulic circuit diagram for the electrolyte feed to the battery of FIG. 1.

FIG. 2 is a hydraulic circuit diagram showing how a battery in accordance with the invention is fed with electrolyte, said battery comprising six 600-volt blocks of cells 31 to 36 connected in parallel. This circuit diagram shows two electrolyte injection manifolds 25 and 25' and two collector manifolds 26 and 26'. Arrows 41 and 41' correspond to the electrolyte being inserted into the odd-numbered cells of the blocks from the injection manifolds, while arrows 40 and 40' correspond to even-numbered cells being emptied into the collector manifolds.

A plurality of injection and evacuation manifolds may be provided in the block 30 whose structure is described below.

The block 30 is constituted by a stack of insulating washers 50 each having the same height as a single cell. Each washer has a central hole defining the duct 3 lying on the axis 4.

Figure 3:
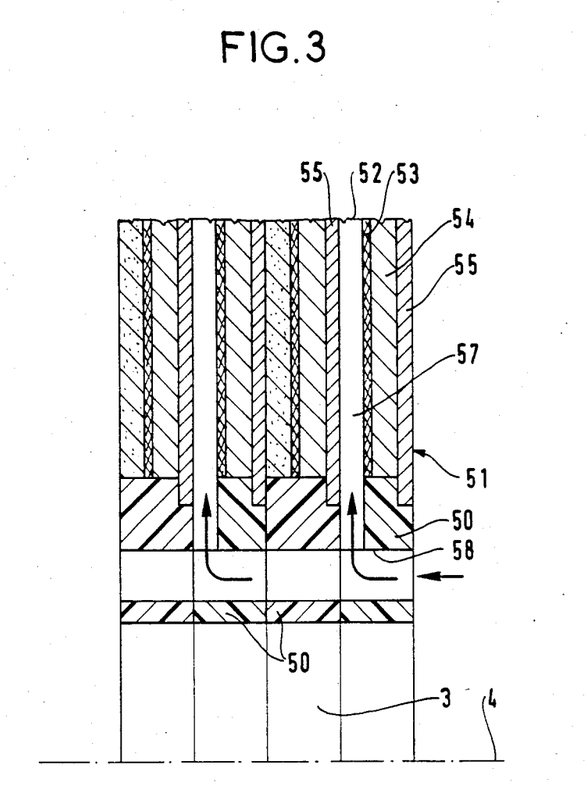
FIG. 3 is a diagrammatic half-section through one cell of the FIG. 1 battery including its central washer.

FIG. 3 is a diagrammatic half-section through four washers 50 associated with a battery of cells 51. Each cell comprises:

a 0.4 mm thick porous cathode 52;
a 0.1 mm thick separator 53,
a 0.15 mm thick lithium anode 54; and
a 0.025 mm thick nickel-plated copper collector 55.

For reasons of clarity, the drawing is not to scale.

The anode 54, the collector 55, and the cathode 52 of each cell constitute a bipolar electrode.

The electrolyte may be caused to flow along an injection duct 58 in communication with a radial channel 57 provided in the cathode 52.

The flow mechanism is described in greater detail with reference to FIGS. 4 and 5 which are plan views of the cathode face 100 of a bipolar electrode and the cathode face 200 of the immediately adjacent bipolar electrode beneath the preceding bipolar electrode.

The cathode 100 is associated with a washer 150 having twelve orifices 101 to 112 regularly distributed thereabout and suitable for belonging to an injection manifold or to a collector manifold.

Figure 4:
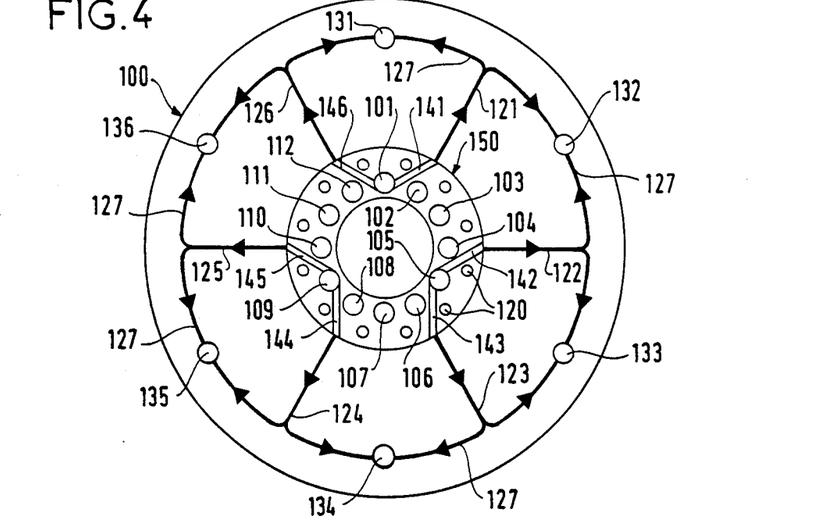
FIG. 4 is a plan view of a bipolar electrode in accordance with the invention and including a central washer.
Figure 5:
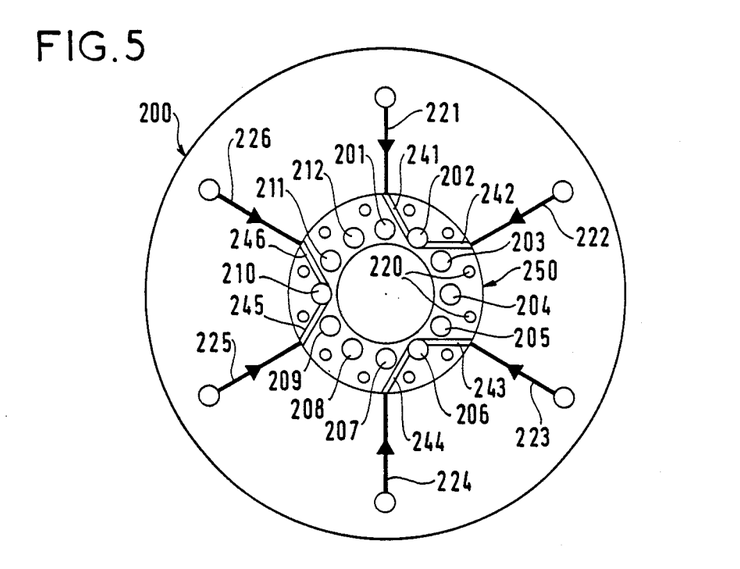
FIG. 5 is a plan view of a bipolar electrode associated with the FIG. 4 electrode.

For reasons of convenience, all of the washers in the pile have the same orifices (see washer 250 of cathode 200 in FIG. 5 and its twelve orifices 201 to 212). In addition, the washers 150 and 250 have orifices 120 and 220 for passing electrical connections.

Radial channels 121 and 126 are provided in the thickness of the cathode 100 together with a peripheral channel 127 which is in communication with orifices 131 to 136 passing through the bipolar electrode. These orifices terminate in respective radial channels 221 to 226 provided in the cathode 200 and angularly offset relative to the channels 121 to 126.

Finally, the washer 150 has grooves 141 and 146 putting the orifice 101 into communication with the channels 121 and 126 respectively. The same is true for grooves 142 and 143 situated between the orifice 105 and the channels 122 and 123 and for grooves 144 and 145 situated between the orifice 109 and channels 124 and 125.

For washer 250 of cathode 200, grooves 241 and 242 put the orifice 202 into communication with channels 221 and 222. Similarly grooves 243 and 244 put the orifice 206 into communication with channels 223 and 224, and grooves 245 and 246 put the orifice 210 into communication with channels 225 and 226.

If the two bipolar electrodes shown in FIGS. 4 and 5 are superposed, it can be seen that electrolyte coming from orifices 101, 105, and 109 spreads (see arrowed path) towards the periphery of the cell via the grooves 141 to 146 and the radial channels 121 and 126 leading to the peripheral channel 127. Thereafter, the electrolyte passes through the orifices 131 to 136 and flows back towards the center of the cell along the channels 221 to 226 until it reaches the grooves 241 to 246 and thence to orifices 202, 206, and 210 belonging to a collector manifold.

By way of example:
the inside diameter of the bipolar electrodes may be 200 mm;
the outside diameter of the bipolar electrodes may be 485 mm;
each washer may be about 0.7 mm high;
the channels may be 0.4 mm deep;
the radial channels may be 6 mm wide;
the peripheral channel may be 3 mm wide; and
the central duct may be 100 mm in diameter.

The channels advantageously occupy between 5% and 20% of the area of the couples.

Figure 6:
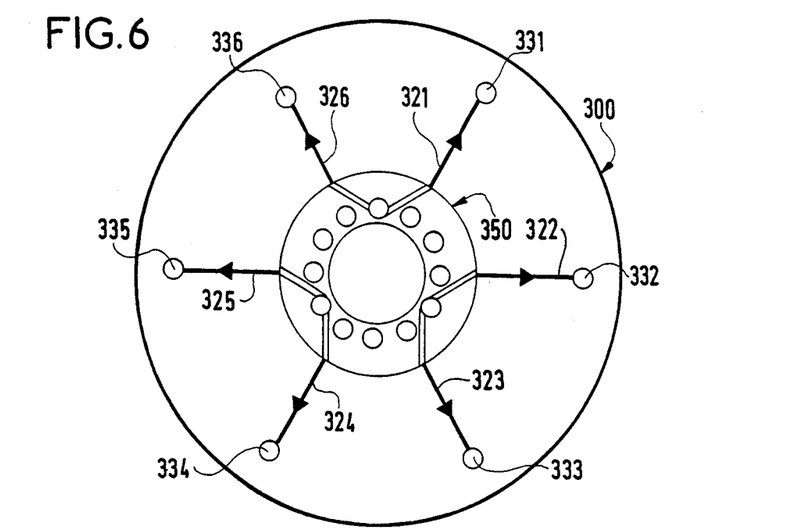
FIG. 6 is a view analogous to FIG. 4 for a variant bipolar electrode.
Figure 7:
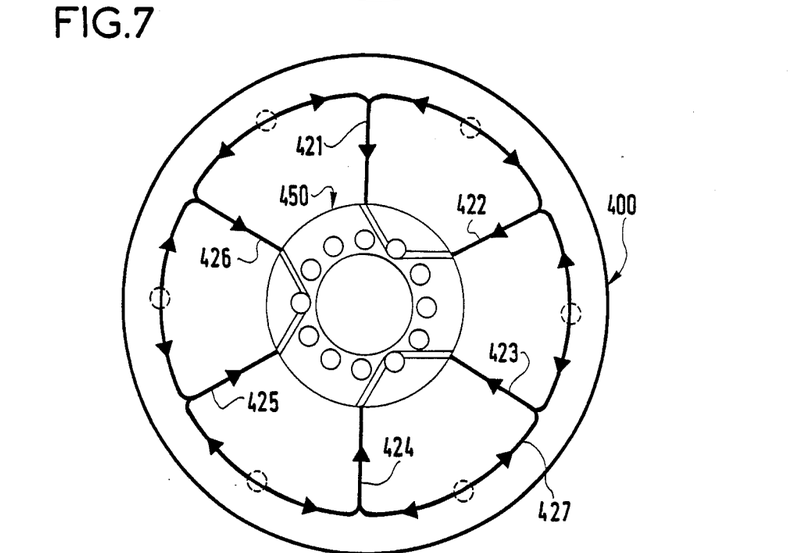
FIG. 7 is a view analogous to FIG. 5 for a bipolar electrode associated with the FIG. 6 electrode.

FIGS. 6 and 7 show variant bipolar electrodes in accordance with the invention.

FIG. 6 which is analogous to FIG. 4 shows a plan view of the cathode face 300 of a bipolar electrode, and FIG. 7 which is analogous to FIG. 5 shows a plan view of the cathode face 400 of the bipolar electrode situated immediately below the preceding electrode.

The cathode 300 has a washer 350 analogous to the washer 150 and includes radial channels 321 to 326 which lead to orifices 331 to 336 which, in this case, are not located in a peripheral channel.

Arrows indicate the centrifugal circuit of the electrolyte leaving the orifices of the washer 350. The cathode 400 fitted with a washer 450 analogous to the washer 250 includes radial channels 421 to 426 which lead to a peripheral channel 427 which communicates with the orifices 331 and 336 of the bipolar electrode shown in FIG. 6.

The centripetal path of the electrolyte from the peripheral channel 427 towards the orifices in the washer 450 is arrowed.

In the embodiments shown in FIGS. 4 to 7, it is advantageous to provide small insulating washers around the orifices providing communication between the couples (e.g. 131 to 136) in order to limit leakage currents.

Figure 8:
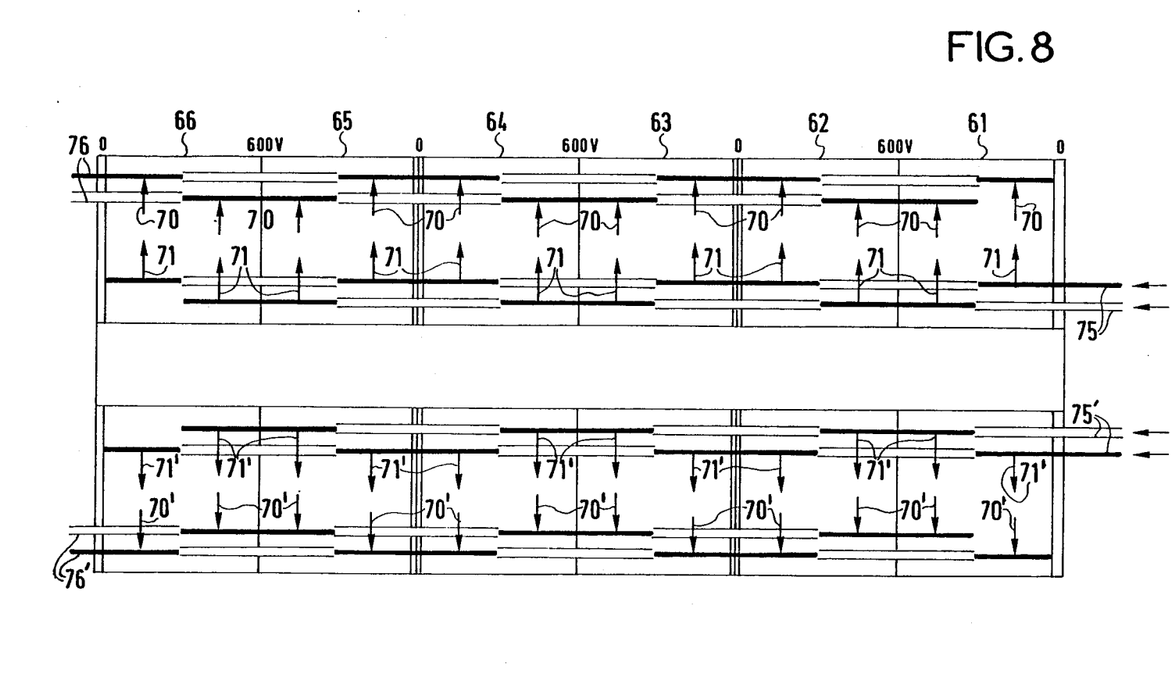
FIG. 8 is a variant hydraulic circuit diagram for the electrolyte feed to the FIG. 1 battery.

FIG. 8 shows a variant hydraulic circuit for feeding a battery comprising six 600-volt blocks 61 to 66 connected in parallel. This figure shows the same two electrolyte injection manifolds 75 and 75' which are centrally disposed together with two collector manifolds 76 and 76' which are peripherally disposed. Arrows 71 and 71' correspond to electrolyte being inserted into the cells of the blocks from the injection manifolds, and arrows 70 and 70' correspond to cells being emptied into the collector manifolds. Naturally, other injection manifolds and other collector manifolds could be added to the circuit diagram.

Figure 9:
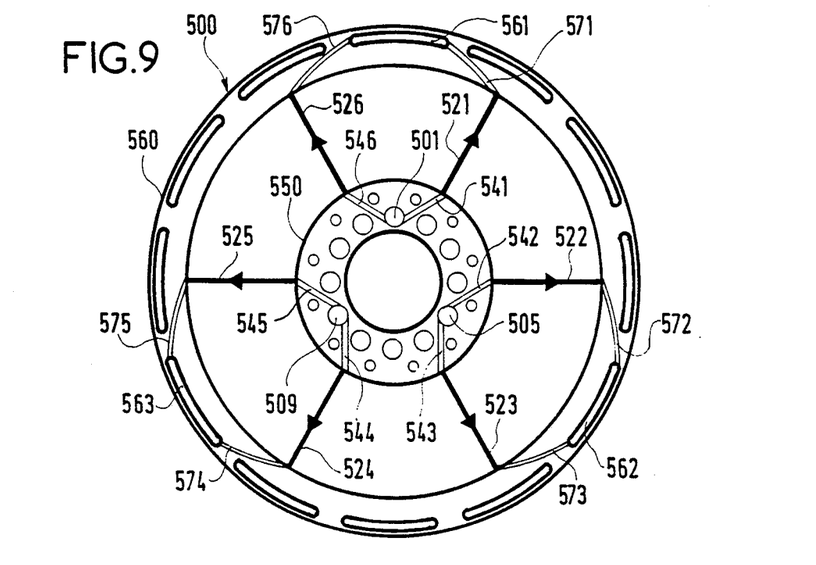
FIG. 9 is a plan view of a variant bipolar electrode in accordance with the invention including a central washer and a peripheral washer.
Figure 10:
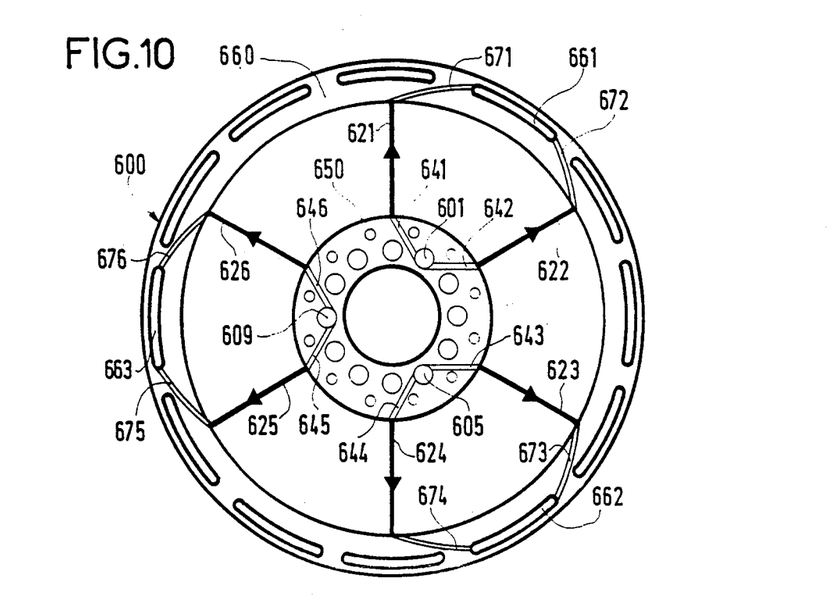
FIG. 10 is a plan view of a bipolar electrode associated with the FIG. 9 electrode.

FIGS. 9 and 10 show variant central washers which are associated with peripheral washers and which provide the same hydraulic circuit as described above.

In FIG. 9, it can be seen that a central washer 550 and a peripheral washer 560 are coaxial. The central washer 550 has twelve (12) orifices suitable for forming part of an electrolyte injection manifold. Three of these orifices, namely orifices 501, 505, and 509 lcoated at the apexes of an equilateral triangle, are in communication via grooves 541 to 546 with radial channels provided in the cathode surface 500 and referenced 521 to 526.

Further, the peripheral washer 560 is provided with twelve orifices suitable for belonging to an electrolyte collector manifold. Three of these orifices referenced 561, 562, and 563 communicate via peripheral connection channels 571 to 576 with respective ones of the radial channels 521 to 526.

FIG. 10 shows a disposition analogous to FIG. 9, but offset angularly therefrom. It includes a central washer 650 and a peripheral washer 660. The orifices 601, 605, and 609 of the central washer 650 form a portion of the electrolyte injection manifold, whereas the orifices 661, 662, and 663 of the washer 660 are in communication with the collector manifolds. The radial channels 621 to 626 in the cathode 600 are in communication firstly with the grooves 641 to 646 of the central washer 650, and secondly with the peripheral connection channels 671 to 676 of the washer 660.

By virtue of the above-described dispostions, the radial conduction of heat is provided by the metal sheets (lithium and metal current collectors), and the transfer of heat away from the battery is provided by the electrolyte circulating through all of the couples up to the electrolyte collector manifolds. The channels provided directly through the electrodes thus provide direct contact between the metal and the electrolyte.

The arrangement in accordance with the invention enables very similar head losses and electrolyte flowrates to be obtained by any couple regardless of its position in the pile.

Further, the electrolyte is conveyed between the insulating envelope of the pile and the heat exchanging shell which provides evacuation of heat out from the battery as a whole.

Naturally, the invention is not limited to the embodiments described in which six radial channels are provided in each cathode; it is possible to provide only four such channels, or in contrast to provide more of them.

The nickel-plated copper collectors may be replaced by nickel-plated aluminum collectors having a thickness of about 25 microns to 100 microns.

In another embodiment, the radial and peripheral channels may be provided in the lithium anodes. However, it appears preferable for them to be provided in the cathodes which are thicker and which tend to swell during discharge unlike the anodes which tend to shrink.

We claim:

1. An activatable battery including a heat exchanger, the batter comprising a Volta pile of a plurality of stacked cells enclosed in an insulating envelope, with each cell of the pile comprising a flat porous cathode electrode, a flat separator, a flat lithium anode electrode, and a flat metal collector, each of said flat elements having a thickness of about several tenths of a millimeter or less and being disposed contiguously one against another, and the heat exchanger being constituted by a circuit for forced circulation of an electrolyte through the pile, said circuit comprising:
   electrolyte injection manifolds and electrolyte collector manifolds, extending through the stacked cells, both the injection and collection manifolds having openings to the outside of said insulating envelope; and
   means for transferring electrolyte from the injection manifolds through each cell to the collector manifolds, said means including channels formed as grooves in the body of at least one electrode of each cell.

2. A battery according to claim 1, wherein said channels are formed in the cathodes of the cells.

3. A battery according to claim 1, wherein said channels occupy between 5% and 20% of the area of the electrodes.

4. A battery according to claim 1, wherein said injection manifolds and said collector manifolds are defined by a stacked set of coaxial washers, each of which includes a plurality of orifices, said orifices being aligned in said coaxially stacked washers and said washers being centrally disposed in said stacked cells.

5. A battery according to claim 4, wherein said means for transferring the electrolyte further comprise grooves provided in each washer in communication with said channels, and a peripheral conduit provided in every other cell and in communication firstly with the channels in itw own cell and secondly via orifices with the channels in an adjacent cell.

6. A battery according to claim 1, wherein said injection manifolds are defined by a stacked set of coaxial washers centrally disposed in the stacked cells and comprising a plurality of aligned orifices, and wherein said collector manifolds are defined by a stacked set of coaxial washers peripherally disposed around the stacked cells and including a plurality of aligned orifices.

7. A battery according to claim 6, wherein said centrally disposed washers have grooves for putting the injection orifices into communication with the channels provided in said electrodes.

8. A battery according to claim 6 or 7, wherein said peripherally disposed washers have connection conduits for putting the collector orifices into communication with the channels provided in said electrodes.

9. A battery according to claim 1, wherein the channels formed in the at least one electrode of each cell extend radially from a central axis of the pile, and wherein the channels of one cell in the pile are angularly offset relative to the channels formed in the at least one electrode of the cell on either side of said one cell.

10. A battery according to claim 1, wherein the circuit for forced circulation of an electrolyte through the pile further comprises a pump for circulating electrolyte from the injection manifolds to the collector manifolds.

* * * * *